Dec. 27, 1938.    G. E. HULSE    2,141,915

PULLEY CONSTRUCTION

Filed April 3, 1935

INVENTOR
George E. Hulse
BY
Blair, Curtis & Dunne
ATTORNEYS

Patented Dec. 27, 1938

2,141,915

UNITED STATES PATENT OFFICE 2,141,915

PULLEY CONSTRUCTION

George E. Hulse, New Haven, Conn., assignor to The Safety Car Heating & Lighting Company, a corporation of New Jersey Application April 3, 1935, Serial No. 14,413

3 Claims. (Cl. 287—52.04)

This invention relates to a pulley assembly and more particularly to a bushing construction for mounting and holding a pulley securely on the axle of a railroad car or the like.

One of the objects of this invention is to provide a simple and practical pulley bushing construction which is capable of holding a pulley or the like securely on an axle. Another object is to provide a bushing construction of the above nature which is inexpensive and yet is extremely durable under rigorous conditions of use. Another object is to provide a bushing construction of the above nature by which a pulley can be mounted in perfect alignment on an axle having a tapered or irregular surface with little difficulty. Another object is to provide a bushing construction of the above nature so designed that a split pulley may be mounted on the axle with the halves thereof drawn closely together. Another object is to provide a bushing construction of the above nature whose dimensions may vary within certain small limits thus reducing the cost of manufacture. Another object is to provide a bushing construction of the above nature which may be readily installed on an axle or the like with a minimum amount of labor and expense. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the several possible embodiments of this invention, Figure 1 is an elevation of the pulley bushing construction mounted on an axle;

Similar reference characters refer to similar parts throughout the several views of the drawing.

For a better understanding of certain features of this invention, various difficulties encountered in mounting a pulley on an axle, such as a railroad car axle, shall first be considered. The surfaces of such axles are often irregular or unmachined and in many instances are tapered. As axles of this nature are generally quite heavy and difficult to handle, pulleys, such as generator drive pulleys, mounted thereon are often split. In many instances, the pulley bushing is so formed that when the sections of a split pulley are secured about the bushing the sections do not engage and accordingly leave gaps which damage the belt and result in inferior operation. Many of these bushings also tend to slip along the tapered axle toward the smaller diameter and accordingly displace the pulley from its proper operating position greatly to the detriment of the belt. Due to the variations in the dimensions of these car axles and the desirability of standardizing bushing equipment for pulleys mounted thereon, it is often difficult to secure the pulley at a certain point along the axle; this results in great inconvenience especially where, as on railroad cars, the driven element, the generator, is definitely located. Such inconvenience is increased when V-shaped belts are employed as these belts should be mounted between pulleys in perfect alignment. One of the objects of this invention is to obviate the above difficulties in addition to many others.

Figure 1:
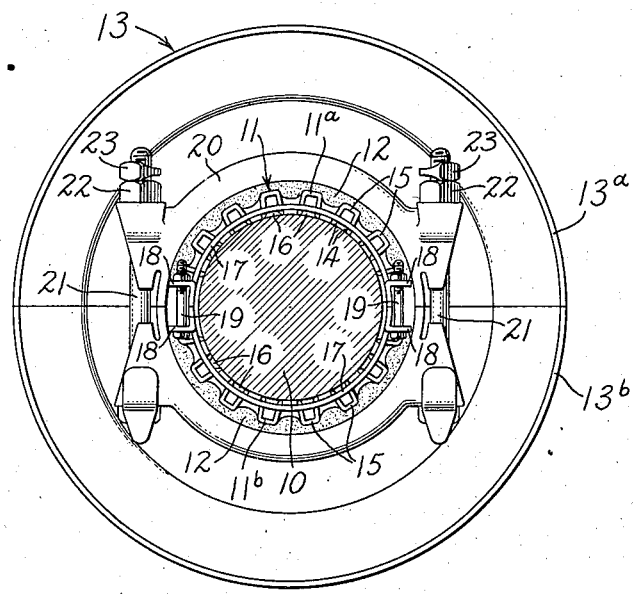

Referring now to the drawing and more particularly to Figure 1, an axle 10 has clamped thereabout a corrugated split bushing generally indicated at 11. Disposed about bushing 11 are corrugated sheets or deformable members 12 and clamped about deformable members 12 is a split pulley generally indicated at 13 preferably suitable for driving a generator (not shown) by means of a V-shaped belt (not shown).

More specifically, corrugated bushing 11 (Figures 2 and 3) preferably comprises two sections 11a and 11b. Conveniently, bushing 11 is formed of steel and may be pressed out or stamped out by an automatic from suitable sheet stock to form oppositely directed projecting portions 14 and 15 (Figure 3). Projecting portions 14 extend toward the center or the axis of bushing 11 and portions 15 extend away from the axis of the bushing. Preferably the extremities of projections 14 and 15 are substantially flat and accordingly comprise the inner and outer bearing surfaces 14a and 15a respectively of the bushing. Thus, surfaces 14a in effect form the bore of bushing 11.

Figure 2:
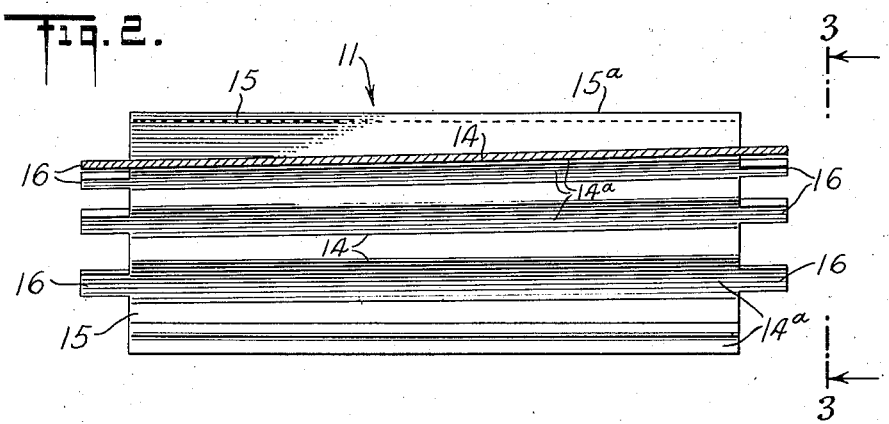
Figure 2 is a vertical section of one of the bushing members.
Figure 3:
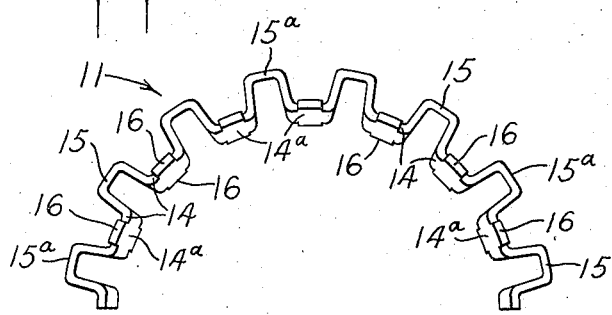
Figure 3 is a section taken along the line 3—3 of Figure 2.

As is more clearly shown in Figure 2, inner surfaces 14a taper from one end of the bushing to the other, i. e., the corrugations on the outer surface of the bushing are deeper at one end than at the other; accordingly, the bore of the bushing has an axial taper. This taper may be of any suitable degree but preferably follows as closely as possible the tapers of the axles for which this bushing is designed. While the metal or flat stock from which the bushing is stamped may be of any desirable gauge, it is preferable that it be sufficiently heavy to give proper rigidity to the bushing so that it will support the pulley assembly in a reliable manner. However, I have found that even in a bushing of extreme rigidity, portions 14a comprising the inner bore of the bushing grip any irregularities existing on the surface of axle 10 so as to conform therewith, in effect, and consequently attain the desired tight fit thereabout. The circumferential spacing of portions 14a aids further in such conformation and assures a tight fit regardless of surface irregularities on the axle.

As is shown in Figure 2, bushing 11 is provided with axially projecting lugs 16 or the like, these lugs extending from each end of the bushing and preferably being simultaneously formed with the corrugations. When the bushing is placed about the surface of axle 10 (Figure 1), suitable securing straps 17 fit about lugs 16 to hold sections 11a and 11b in position thereon. Each of straps 17 is preferably provided with registering ear clamps 18 or the like having holes (not shown) formed therein. When positioned on lugs 16, clamps 18 and accordingly straps 17 are drawn together by suitable nuts and bolts generally indicated at 19. As nuts and bolts 19 are taken up, clamps 18 are pulled together to tension straps 17 about lugs 16 and accordingly secure bushing 11 tightly about axle 10.

Figure 4:
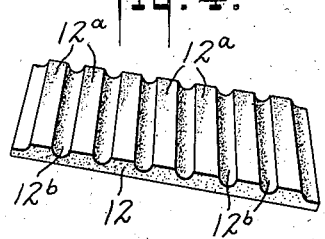
Figure 4 is a perspective view of another of the bushing members.

With reference to Figure 4, corrugated deformable members 12 are preferably made of rubber or other suitably resilient material which, upon compression, will flow along the line of least resistance. Deformable members 12 may be suitably formed by molding rubber or the like to provide alternate projections and depressions 12a and 12b. Deformable members 12 are proportioned to fit about section 11a and 11b of bushing 11 so that projections 12a of the deformable members lie between projections 15 and consequently surfaces 15a thereof rest within depressions 12b of sheet 12. Furthermore, projections 12a are desirably not as deep as projections 15 and accordingly when they are in normal position about the bushing they do not fill the corrugations between projections 15.

Pulley 13 (Figure 1) preferably comprises two sections 13a and 13b and accordingly may be conveniently mounted about deformable members 12. Suitable clamp members 20 desirably on the hub portions of sections 13a and 13b have bolts or the like generally indicated at 21 extending therethrough. Nuts 22 are threaded on bolts 21 and upon being taken up bring into abutment sections 13a and 13b of pulley 13. When sections 13a and 13b are in abutting relationship, as shown in Figure 1, take-up nuts 22 may be locked in position by lock nuts 23.

It will now be clear that as sections 13a and 13b of pulley 13 are forced together by take-up nuts 22, deformable members 12 are tightly compressed about bushing 11. Projections 12a of deformable members 12 flow into the corrugations between projections 15 of the bushing but still do not fill the corrugations as shown in Figure 1. Thus, in effect, projections 15 of the bushing sink into the deformable members to assure an extremely tight driving relationship between the pulley and axle. More important, when the deformable members are compressed by the tightening of the pulley sections thereabout, the rubber is free to flow between the projections 15 of the bushing with no frictional resistance, thus assuring a tight engagement of the pulley sections. Although the deformable members may be thus compressed easily, there is a tight frictional interlock between the bushing 11 and the deformable members; the pulley may grip the deformable members with sufficient firmness and the whole assembly is reliably held to the axle by the tight fit between the axle and bushing 11. Further still, while the deformable members are being compressed there is no necessity for the rubber to flow axially between the bushing and the pulley where it would meet with marked frictional resistance; all such flow follows the line of least resistance into the bushing corrugations.

Thus, the above-mentioned difficulties in addition to many others have been overcome and the several objects hereinabove set forth in addition to others have been achieved in a thoroughly efficient and practical manner.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In a pulley construction wherein a split pulley is disposed about a part secured to an axle, said part having an irregular surface, the combination with said part and said pulley of a deformable member formed of rubber and having an irregular surface, said member being disposed between said pulley and said part, the material of said member being adapted to flow into the irregularities of said irregular surface when said pulley is tightened about the axle, whereby relative movement between said driving member and said axle is prevented.

2. In a pulley construction wherein a split pulley is disposed about a part secured to an axle, said part having a corrugated surface, the combination with said part and said pulley of a bushing member formed of deformable material and disposed between said pulley and said axle, the material of said member being adapted to flow radially of said axle into the corrugations of said corrugated surface when said pulley is tightened about the axle, whereby relative movement between the pulley and axle is prevented.

3. In a pulley construction wherein a split pulley is disposed about a part secured to an axle, said part having a corrugated surface, the combination with said part and said pulley of a bushing member comprising a plurality of parts, each of which is formed of deformable material and disposed between said pulley and said axle, the material of said parts being adapted to flow radially of said axle into the corrugations of said corrugated surface when said pulley is tightened about the axle, whereby relative movement between the pulley and axle is prevented.

GEORGE E. HULSE.